(12) United States Patent
Shiina

(10) Patent No.: US 8,599,131 B2
(45) Date of Patent: Dec. 3, 2013

(54) INFORMATION DISPLAY APPARATUS, MOBILE INFORMATION UNIT, DISPLAY CONTROL METHOD, AND DISPLAY CONTROL PROGRAM

(75) Inventor: Takashi Shiina, Kanagawa (JP)

(73) Assignees: Sony Corporation, Tokyo (JP); Sony Mobile Communications, Inc., Tokyo (JP)

(*) Notice: Subject to any disclaimer, the term of this patent is extended or adjusted under 35 U.S.C. 154(b) by 643 days.

(21) Appl. No.: 12/603,611

(22) Filed: Oct. 22, 2009

(65) Prior Publication Data

US 2010/0103097 A1    Apr. 29, 2010

(30) Foreign Application Priority Data

Oct. 23, 2008  (JP) ................................ P2008-272780

(51) Int. Cl.
*G06F 3/033*  (2013.01)
*G06F 3/041*  (2006.01)
*G09G 5/08*  (2006.01)

(52) U.S. Cl.
USPC ............................. 345/157; 345/173; 345/178

(58) Field of Classification Search
USPC ........................................................ 345/157
See application file for complete search history.

(56) References Cited

U.S. PATENT DOCUMENTS

| 5,621,438 A * | 4/1997 | Kamimura et al. ........... 345/178 |
| 2006/0119586 A1* | 6/2006 | Grant et al. ................... 345/173 |
| 2006/0244735 A1* | 11/2006 | Wilson .......................... 345/173 |
| 2007/0097096 A1* | 5/2007 | Rosenberg .................... 345/173 |

FOREIGN PATENT DOCUMENTS

| GB | 2 347 200 | 8/2000 |
| JP | 6-301486 | 10/1994 |
| JP | 2000 347787 | 12/2000 |
| JP | 2005 128802 | 5/2005 |

OTHER PUBLICATIONS

Fourth Office Action issued in corresponding Chinese application No. 200910205441.4 dated Aug. 20, 2013.

* cited by examiner

*Primary Examiner* — Charles V Hicks
(74) *Attorney, Agent, or Firm* — Frommer Lawrence & Haug LLP; William S. Frommer; Ellen Marcie Emas

(57) ABSTRACT

An information display apparatus including a contact detecting panel unit that detects at least contact with the approximately transparent panel surface thereof made by an external object; a display panel unit installed on the panel back surface of the contact detecting panel unit; an analyzing unit that analyzes a contact position of the panel surface with which the external object makes contact and a direction indicated by a specific portion of the external object on the basis of output values from the contact detecting panel unit; and a pointer control unit that controls a display position and a pointing direction of a predefined pointer image displayed on the display panel unit on the basis of the contact position and the direction indicated by the specific portion, in which both the contact position and the direction are obtained from the analyzing unit.

10 Claims, 7 Drawing Sheets

INFORMATION DISPLAY APPARATUS, MOBILE INFORMATION UNIT, DISPLAY CONTROL METHOD, AND DISPLAY CONTROL PROGRAM

BACKGROUND OF THE INVENTION

1. Field of the Invention

The present invention relates to an information display apparatus, which is equipped with a touch panel that works as an input device for a user interface, that controls the display of a so-called mouse pointer on a display screen on the basis of input information from the touch panel, a mobile information unit having the same function as the information display apparatus, a display control method and a display control program used therein.

2. Description of the Related Art

In recent years, various kinds of mobile devices such as a cellular phone unit, a portable music player and a PDA (personal digital assistant) that are equipped with a touch panel or a touch pad (both of them are referred to as a touch panel hereinafter) have been commercially produced. In addition, various types of touch panels such as those of a resistive film type, a pressure sensitive type, an electrostatic capacitor detecting type, an ultrasonic surface acoustic wave detecting type, an acoustic pulse recognition type, a vibration detecting type, an infrared light shielding type, an image recognition type and an electrostatic sensor type have been developed or commercially produced. The above-mentioned various types of touch panels are representative examples, and many other types have been also proposed. Because these types of touch panels may be produced using existing technologies, detailed explanation about these existing technologies is omitted.

As another example, in Japanese Unexamined Patent Application Publication No. 2000-347787 (See FIG. 1 thereof), a touch panel display apparatus, in which a pointer displayed on a display screen is controlled by the way the touch panel of the touch panel display apparatus is touched, has been disclosed. In other words, in the touch panel display apparatus described in Japanese Unexamined Patent Application Publication No. 2000-347787, the display of the pointer is controlled in such a way that the pointer is not displayed when the touched position of the touch panel belongs to the nondisplay area of the touch panel, and the pointer is displayed when the touched position of the touch panel belongs to the area other than the nondisplay area.

In Japanese Unexamined Patent Application Publication No. 2005-128802 (See FIG. 7 thereof), a cellular phone unit in which a cursor displayed on a display screen is moved with the use of a pressure type pointing device that issues signals on the basis of a depressive force and a depressive direction.

SUMMARY OF THE INVENTION

Generally speaking, such a mobile device equipped with a touch panel as mentioned above displays several icons on its display screen, and the mobile device is configured to start an application program corresponding to an icon when a portion of panel corresponding to the display position of the icon is touched by a finger or the like.

However, in the case where a user with large (or thick) fingers operates (or touches) a touch panel, it is often difficult for the user to touch (or depress) an icon depending on the display position of the icon. For example, if the user uses his/her right hand to operate the touch panel, it may be difficult for him/her to touch icons located on the lower right corner of the touch panel. For the same reason, if the user uses his/her left hand to operate the touch panel, it may be difficult for him/her to touch icons located on the lower left corner. Currently there is no technology to solve such an issue regarding a touch panel as mentioned above.

In addition, when a user with large fingers operates a touch panel, there is a possibility that the user touches another icon other than the desired one or that the user touches plural icons. In this case, another application other than the desired one might start.

Therefore, a user with large his fingers has to use a so-called stylus pen or the like to touch a desired icon in order to start a desired application. Alternatively, the user has to use another operation device (such as an arrow key) to start a desired application, and it is certain that these operations are very troublesome for the user.

The present invention is proposed with the above mentioned actual situation in mind, and it provides an information display apparatus that makes the operation of its touch panel easy and enables a user to surely touch a desired icon and the like, a mobile information unit having the same function as the information display apparatus, a display control method and a display control program used therein.

An information display apparatus according to an embodiment of the present invention includes a contact detecting panel unit that detects at least contact with the approximately transparent panel surface thereof made by an external object and a display panel unit installed on the panel back surface of the contact detecting panel unit. In addition, the information display apparatus according to the embodiment of the present invention includes an analyzing unit and a pointer control unit. In addition, the analyzing unit analyzes a contact position of the panel surface of the contact detecting panel unit with which the external object makes contact and a direction indicated by a specific portion of the external object on the basis of output values of the contact detecting panel unit. The pointer control unit also controls a display position and a pointing direction of a predefined pointer image displayed on the display panel unit on the basis of the contact position and the direction indicated by the specific portion, in which both the contact position and the direction indicated by the specific portion are obtained from the analyzing unit. Owing to the above configuration of the display control apparatus, the above-mentioned problems can be solved.

To explain the embodiment of the present invention concretely, the display control apparatus finds the contact position of the panel surface of the contact detecting panel unit with which the external object makes contact and the direction indicated by the specific portion of the external object, and determines the display position and pointing direction of the predefined pointer image displayed on the display panel unit on the basis of the contact position and the direction indicated by the specific portion. In other words, a user makes a choice of his/her desired icon or the like by using the pointer image instead of directly touching the icon using his/her finger etc.

The pointer control unit controls the display position of the predefined pointer image in the direction indicated by the specific portion and in the vicinity of the contact position, and at the same time the pointer control unit controls the pointing direction of the predefined pointer image on the basis of the direction indicated by the specific portion.

To put it concretely, according to the embodiment of the present invention, the pointer image is displayed not in the position specified by the user's finger etc. but it is displayed in the direction indicated by the specific portion of the user's finger etc. and in the vicinity of the contact position of the user's finger etc. In addition, the pointing direction of the pointer image becomes identical to the direction indicated by the specific portion of the user's finger.

In the embodiment of the present invention, the contact position on the panel surface of the contact detecting panel unit with which the external object makes contact and the direction indicated by a specific portion of the external object are calculated and the display position and the pointing direction of the pointer image displayed on the display panel unit is determined on the basis of the above-mentioned contact position and direction, so that it may be possible that even a user with thick fingers operates the touch panel easily and surely touches a desired icon and the like.

DESCRIPTION OF THE PREFERRED EMBODIMENT

A preferred embodiment of the present invention will be described hereinafter with reference to the attached drawings.

In this embodiment, a cellular phone unit equipped with a touch panel of a pressure sensitive type that uses pressure sensors is taken as an example apparatus to which the present invention is applied. Therefore, the contents described hereinafter are only those regarding the preferred embodiment, and it goes without saying that the present invention is not limited to this specific embodiment. The present invention can be applied to various types of touch panels such as those of a resistive film type, an electrostatic capacitor detecting type, an ultrasonic surface acoustic wave detecting type, an acoustic pulse recognition type, a vibration detecting type, an infrared light shielding type, an image recognition type and an electrostatic sensor type.

[Block Diagram Showing an Internal Schematic Configuration of a Cellular Phone Unit]

Figure 1:
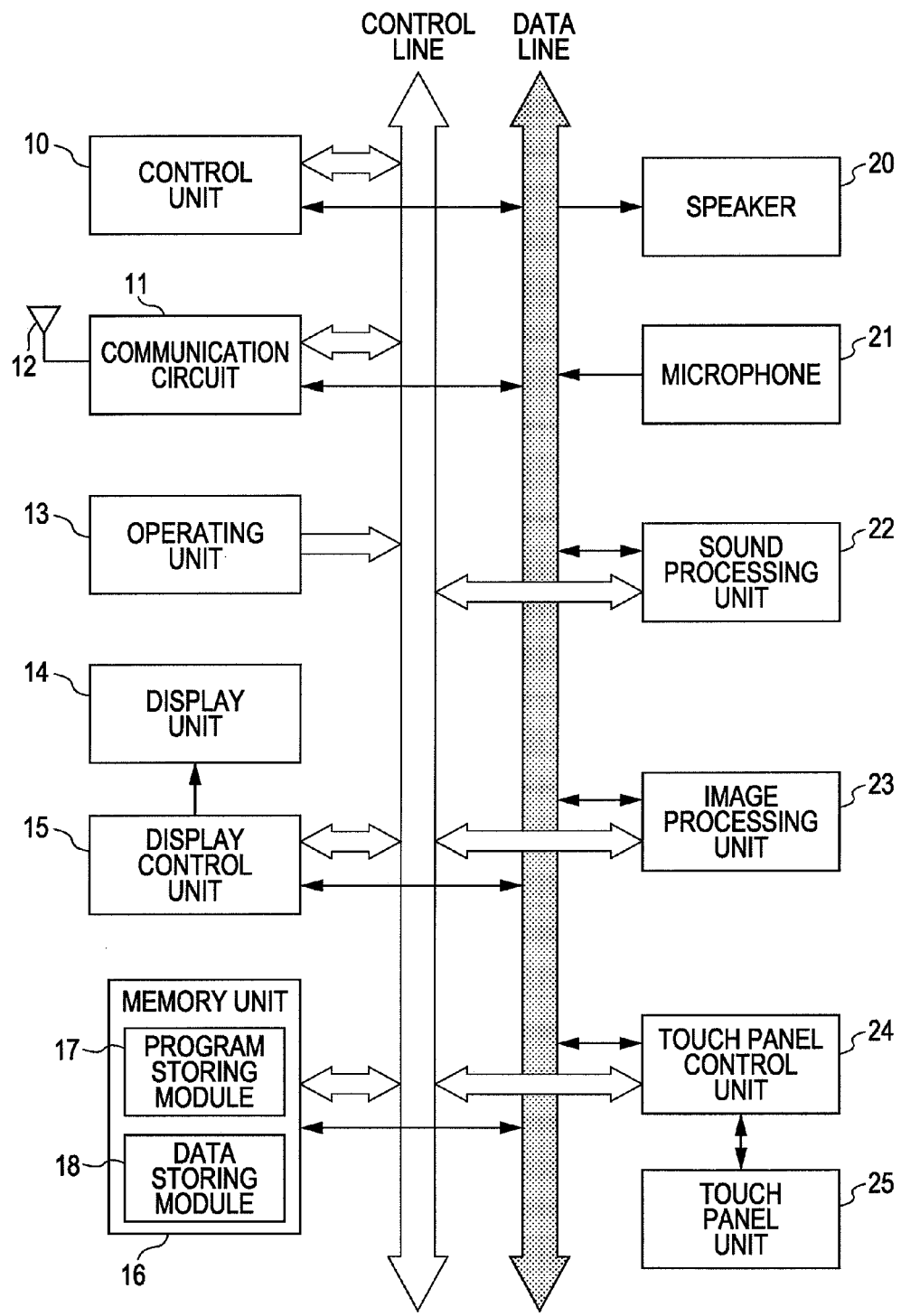
FIG. 1 is a block diagram showing an internal schematic configuration of a cellular phone unit according to an embodiment of the present invention.

FIG. 1 is a block diagram showing an internal schematic configuration of a cellular phone unit according to this embodiment of the present invention.

In FIG. 1, a communication antenna 12 and a communication circuit 11 are used for transmission and reception of signal waves of phone calls and packet communication; and frequency conversion, modulation, demodulation and the like of transmitter and receiver signals.

A speaker 20 is composed of a phone call receiving speaker for the cellular phone unit and a speaker for alarm sounds, played-back music, etc. A microphone 21 is used for phone call transmission and collection of external sounds. A sound processing unit 22 performs various types of processes regarding phone call data, the sounds of played-back music, etc.

An operating unit 13 is composed of various operating parts such as a numeric keypad, a call key, an end/power key, an arrow key, a shutter button, a jog dial, etc. that are all mounted on the chassis (not shown) of the cellular phone unit, and an operating signal generator that, when an operating part is operated, generates a signal corresponding to the operating part. Meanwhile, the functions of some keys, buttons, etc. of the operating unit 13 can be assigned to a touch panel unit 25, and then these keys, buttons, etc. can be omitted.

A display unit 14 is a display device composed of, for example, a liquid crystal display panel or an organic EL display panel. A display control unit 15 controls a display driving circuit of the display unit 14 to display characters, symbols, icons, a mouse pointer, still images, moving images and the like on the display screen of the display unit 14. An image processing unit 23 performs various processes such as generating display image data for characters, symbols, still images, moving images and the like to be displayed on the display screen of the display unit 14. Meanwhile, the functions of the display control unit 15 can be performed by a control unit 10.

A memory unit 16 stores, for example, an OS (operating system) program, various application programs such as a control program that the control unit 10 uses to control other units, a display control program for controlling the display of a mouse pointer etc. on the basis of the operation of a touch panel, and other various data. The display control of the mouse pointer etc. based on the operation of the touch panel according to an embodiment of the present invention will be described later. The memory unit 16 also stores necessary data and serves as a working area for the control unit 10. Meanwhile, a program storing module 17 of the memory unit 16 stores various application programs relating to the embodiment of the present invention such as the display control program and a data storing module 18 stores various data including parameters and threshold values etc. used by the display control program. Meanwhile, various programs, which are stored in the memory unit 16 and relate to the embodiment of the present invention including the display control program, can be stored in the memory unit 16 via disk type storage media, external semiconductor memories, or via external storage media through cables or wireless networks using external interfaces.

The touch panel unit 25 includes an approximately transparent panel that is disposed on the display panel surface of the display unit 14. The panel is a touch panel of a pressure sensitive type equipped with pressure sensors. Although the details will be described hereinafter, when an external object such as a user's finger applies pressure on the panel surface of the touch panel unit 25, the touch panel unit 25 detects the pressure and generates and outputs numerical values representing the applied pressure (pressure value signals). The panel surface of the touch panel unit 25 is divided into plural minute pressure detecting blocks, and each pressure detecting block has a pressure sensor. Output signals from these pressure sensors are sent to a touch panel control unit 24.

The touch panel control unit 24 performs the start-up control (activation ON/OFF control) of the pressure sensors of the touch panel unit 25, and an analog-to-digital conversion in which the pressure value signals sent from activated pressure sensors are converted into pressure value data. The touch panel control unit 24 also performs position detecting processing in which the coordinate values on the panel for pressure-applied pressure sensors are generated. To put it concretely, the touch panel control unit 24 detects the positions on the touch panel at which the pressure-applied pressure sensors or pressure applied-pressure detecting blocks are disposed as coordinate values.

The control unit 10 includes a CPU (central processing unit), and performs control of the units, various signal processing controls, etc. of the cellular phone unit according to this embodiment of the present invention. In this embodiment of the present invention, it is worth noting that the control unit 10 executes the display control program stored in the program storing module 17 of the memory unit 16, and performs various accompanying data processing tasks. The details will be described hereinafter.

Although they are not shown in FIG. 1, the cellular phone unit according to this embodiment is equipped with various component parts that an ordinary cellular phone unit has.

[Contact Pressure Distribution on the Panel Surface Caused by Depression with a Finger]

When the user's finger or the like makes contact with the surface of the touch panel unit 25 as an external object, the finger or the like makes contact with some of the minute pressure detecting blocks. Therefore pressure values are detected from the plural pressure detecting blocks with which the finger or the like makes contact.

In addition, the pressure values detected from those pressure detecting blocks are different from each other because all the pressures caused by the contact portions of the finger or the like are not equal. In other words, when a finger or the like makes contact with the panel surface, there are various contact pressures from large ones to small ones.

Therefore, if these different pressure values detected from the plural pressure detecting blocks with which the finger or the like makes contact are analyzed, the pressure distribution caused by the finger or the like which makes contact with the panel surface can be obtained.

Then if the pressure distribution caused by the finger or the like is known, it becomes possible to extrapolate the direction indicated by a specific portion of the finger (, for example the fingertip) on the panel surface.

Generally speaking, if a finger is placed in contact with a plane surface, the pressure applied to the plane surface by the fingertip is the largest and the pressure applied by a portion of the finger gradually decreases as the portion gets closer to the base of the finger.

As a result, if a pressure distribution caused by a finger is analyzed, it becomes possible to extrapolate the direction indicated by the fingertip.

In the cellular phone unit according to this embodiment, if a finger makes contact with some of pressure detecting blocks, the control unit 10 analyzes a pressure distribution caused by the finger as mentioned above using output signals from the touch panel control unit 24, and detects the direction indicated by the fingertip.

Figure 2:
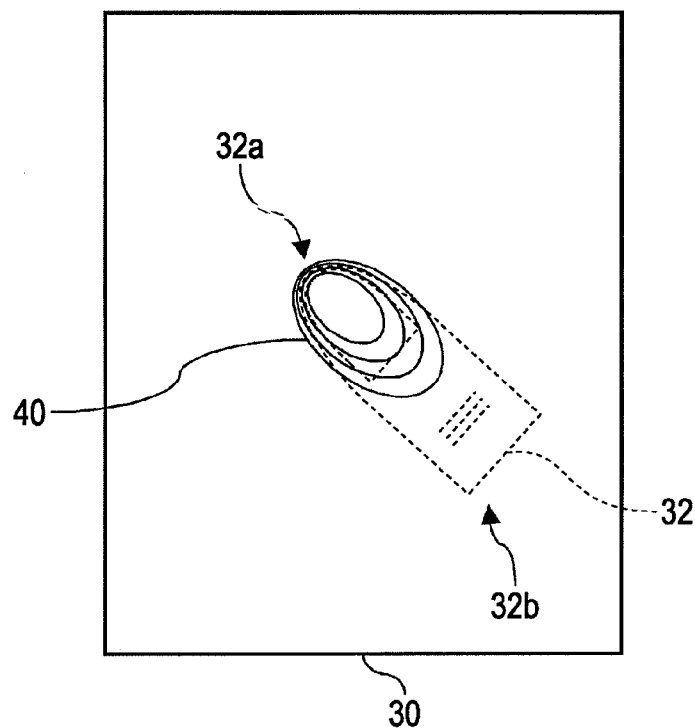
FIG. 2 is a diagram showing an example of a schematic contact pressure distribution when a finger makes contact with a panel surface of a touch panel unit.
Figure 3:
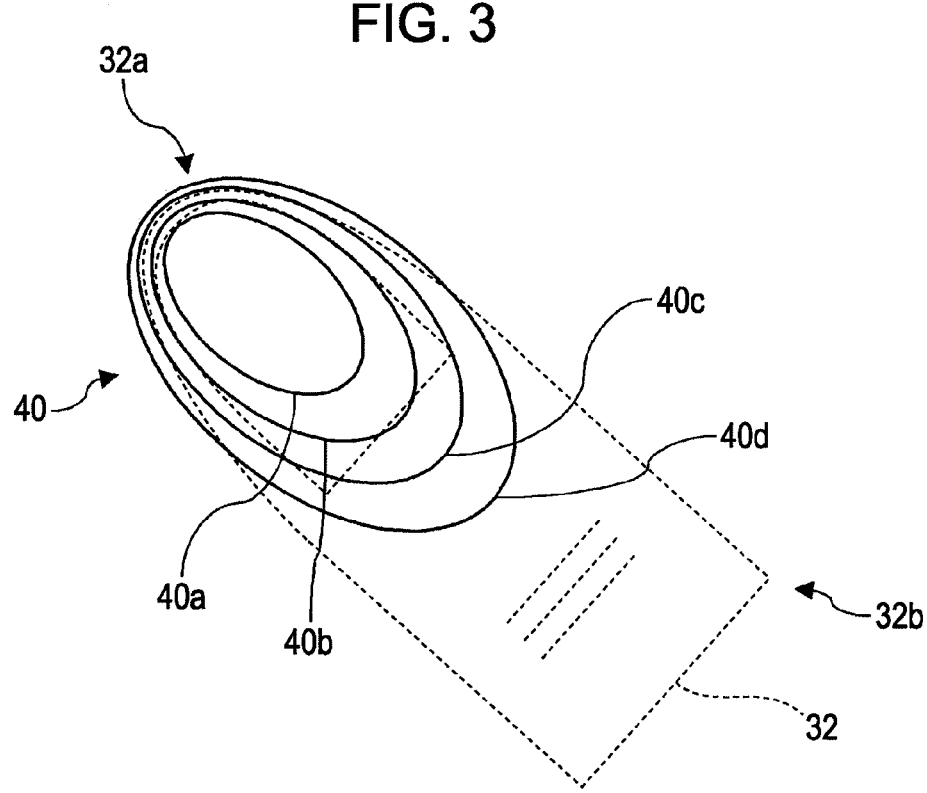
FIG. 3 is a diagram showing an enlarged view of the finger and the pressure distribution in FIG. 2.

FIG. 2 is an example of a schematic contact pressure distribution 40 when a finger 32 shown by dotted lines makes contact with a panel surface 30 of the touch panel unit 25. FIG. 3 shows an enlarged view of the pressure distribution 40 in FIG. 2. In FIG. 3, intensities of the pressures are represented by pressure distribution lines 40*a*, 40*b*, 40*c* and 40*d*, which are like so-called contours regarding pressures. The area within the pressure distribution line 40*a* represents an area with the largest degree of pressure, the area between the pressure distribution line 40*a* and 40*b* represents an area with the second largest degree of pressure, the area between the pressure distribution line 40*b* and 40*c* represents an area with the third largest degree of pressure, and the area between the pressure distribution line 40*c* and 40*d* represents an area with the smallest degree of pressure. The area outside the pressure distribution line 40*d* represents an area with the degree of pressure of nearly zero because the finger does not make contact with the area.

As can be judged from FIG. 2 and FIG. 3, if a finger 32 makes contact with the panel surface 30, the pressure distribution caused by the finger 32 shows that the pressure applied to the plane surface by the fingertip 32*a* is the largest and the pressure applied by a portion of the finger gradually decreases as the portion gets closer to the base of the finger 32*b*.

Figure 4:
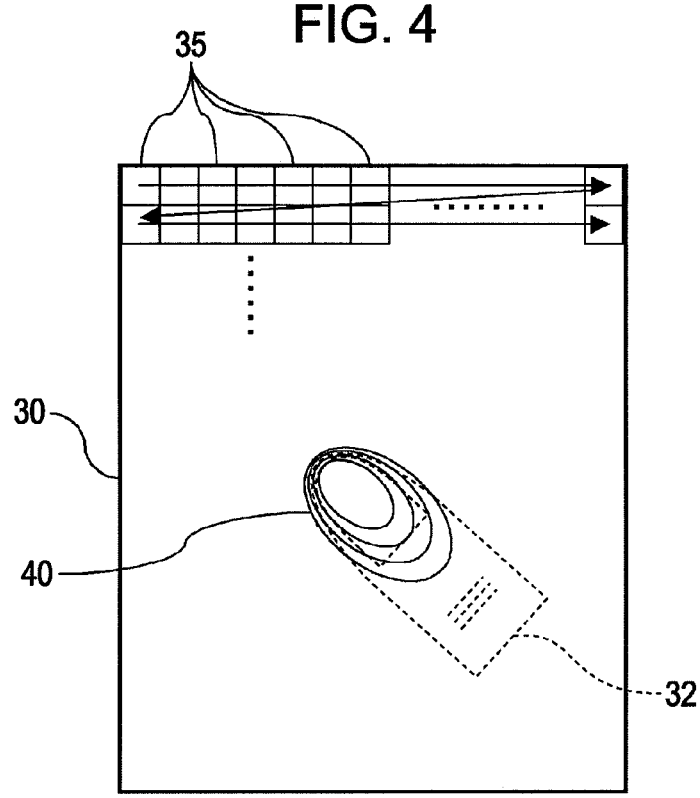
FIG. 4 is a diagram showing plural pressure detecting blocks disposed on the touch panel and an example of schematic contact pressure distribution when the finger makes contact with the panel surface.

FIG. 4 shows plural pressure detecting blocks 35 disposed on the touch panel 25 and an example of schematic contact pressure distribution 40 when the finger 32 makes contact with the panel surface 30. In FIG. 4, although the sizes (areas) of pressure detecting blocks 35 are depicted as being larger than they actually are for illustration purposes, they are really far smaller than the sizes (areas) of pressure detecting blocks 35 depicted in FIG. 4.

In this embodiment, the touch panel control unit 24 scans the pressure detecting blocks 35 disposed on the panel surface 30 sequentially as indicated by arrows in FIG. 4, and when detecting a pressure detecting block 35 whose sensor outputs some pressure value, the touch panel control unit 24 performs more detailed pressure detection regarding pressure detecting blocks surrounding the pressure detecting block 35 whose sensor outputs the pressure value.

Then the control unit 10 calculates the pressure distribution 40 by analyzing the magnitudes of pressure values obtained from the pressure detecting blocks 35, and detects the direction indicated by the fingertip of the finger 32 on the basis of the pressure distribution 40.

[Display Control Based on the Contact Pressure Distribution on the Panel Surface]

The cellular phone unit according to this embodiment is configured to control the pointing direction indicated by a mouse pointer, for example, displayed on the display screen on the basis of the direction indicated by the fingertip of the finger 32 when the cellular phone unit detects the direction indicated by the fingertip on the basis of the pressure distribution caused by the finger 32 that makes contact with the above-mentioned panel surface 30.

Figure 5:
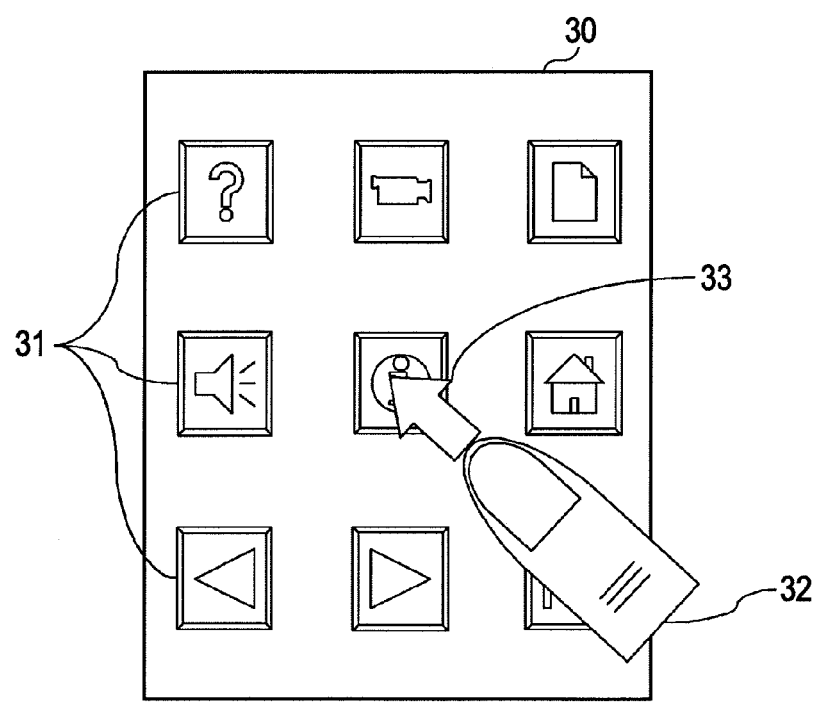
FIG. 5 is a diagram used to explain the relation between the direction indicated by the finger and the direction of a mouse pointer on the display screen when the finger is placed on the lower right part of the panel surface and its fingertip points in the direction from the lower part of the panel surface to the upper left.
Figure 6:
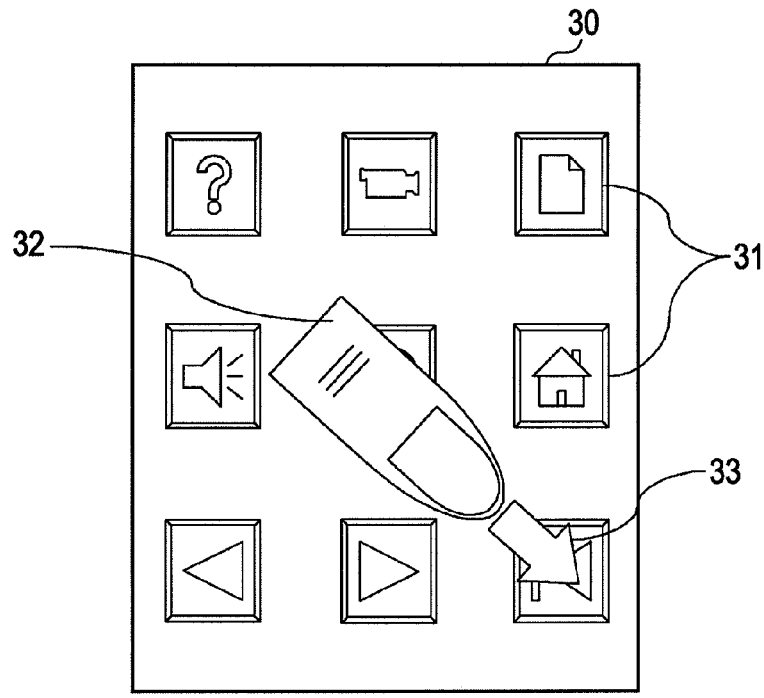
FIG. 6 is a diagram used to explain the relation between the direction indicated by the finger and the direction of the mouse pointer on the display screen when the finger is placed nearly on the middle part of the panel surface and the fingertip points in the direction from the upper left part of the panel surface to the lower right.

In FIG. 5 and FIG. 6, the above-mentioned panel surface 30, image examples displayed on the display screen at the lower part of the panel surface 30, and the finger 32 that makes contact with the panel surface 30 are shown.

To put it concretely, as shown in FIG. 5 and FIG. 6, the cellular phone unit according to this embodiment detects the contact position of the finger 32 (the position on the panel surface 30 with which the finger 32 makes contact) when the finger 32 makes contact with the panel surface 30, and at the same time detects the direction indicated by the fingertip on the basis of the pressure distribution caused by the finger 32. Then, on the basis of the detected contact position and the detected direction indicated by the fingertip, the cellular phone unit controls the display position of the mouse pointer 33 and the direction indicated by the arrow of the mouse pointer.

FIG. 5 shows the case where the finger 32 is placed on the right lower part of the panel surface 30 and the fingertip shows the direction from the lower part of the panel surface to the upper left. In FIG. 5, the control unit 10 performs display control so that the mouse pointer 33 is displayed in the position that is judged from the pressure distribution 40 to be both in the direction of the fingertip and in the vicinity of the fingertip and at the same time the arrow of the mouse pointer shows the direction from the lower right part of the panel surface to the upper left on the basis of the pressure distribution 40.

FIG. 6 shows the case where the finger 32 is placed nearly on the middle part of the panel surface 30 and the fingertip shows the direction from the upper left part of the panel surface to the lower right. In FIG. 6, the control unit 10 performs display control so that the mouse pointer 33 is displayed in the position that is judged from the pressure distribution 40 to be both in the direction of the fingertip and in the vicinity of the fingertip and at the same time the arrow of the mouse pointer shows the direction from the upper left part of the panel surface to the lower right on the basis of the pressure distribution 40.

Therefore, if the user wants to select an icon located on the lower right corner of the icons displayed on the display screen for example, he has only to put his finger in the direction from upper left to lower right on the display screen as shown in FIG. 6. According to the example shown in FIG. 6, even if the finger of the user is thick and it's difficult for the user to touch the icon directly on the lower right corner for example, the user can select the icon easily.

In addition, the reason why the mouse pointer 33 is displayed in the position that is judged from the pressure distribution 40 to be both in the direction of the fingertip and in the vicinity of the fingertip is that attention is paid lest the mouse pointer 33 should be hidden by the finger 32 with consideration given to the fact that the fingertip is commonly used by the user to point at something.

[Display Control in the Case where the Finger Moves Along the Panel Surface]

The cellular phone unit according to this embodiment is configured to control the mouse pointer 33 so that the mouse pointer 33 moves along with the movement of the finger 32 when the finger 32 moves along the panel surface 30.

Figure 7:
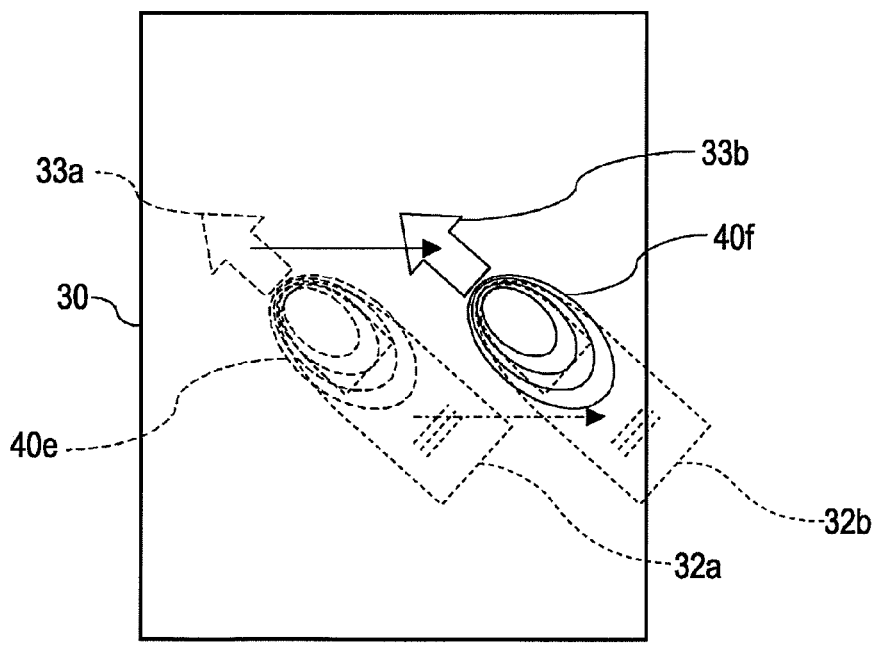
FIG. 7 is a diagram used to explain the control of the display of shifting of the mouse pointer when the finger moves to the right after the finger is placed slightly to the left side of the middle part of the panel surface.
Figure 8:
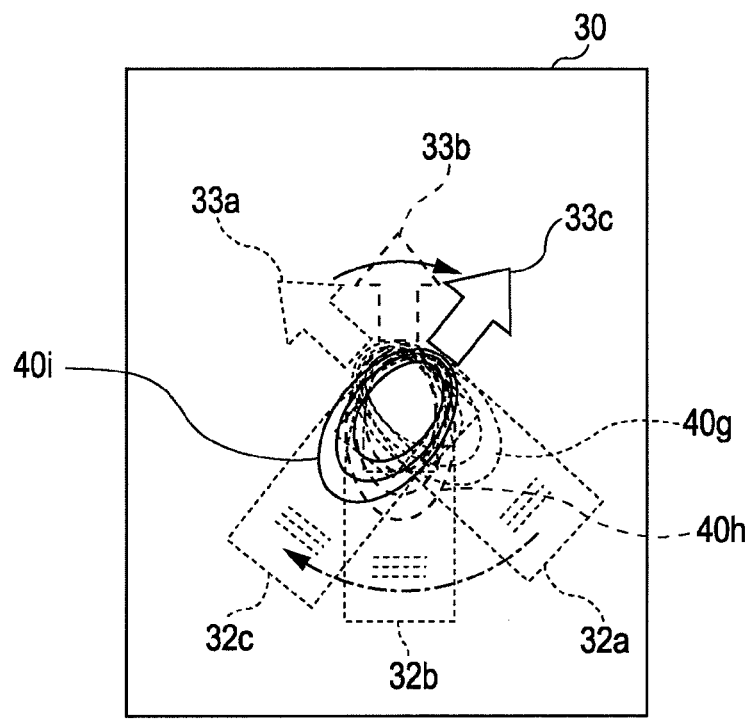
FIG. 8 is a diagram used to explain the control over the display of the rotation of the mouse pointer when the fingertip rotates clockwise while the contact position of the finger does not move after the finger is placed nearly on the middle part of the panel surface.

FIG. 7 and FIG. 8 show the relation among the panel surface 30, the finger 32 that makes contact with the panel surface 30, and the mouse pointer 33 displayed on the display screen.

To put it concretely, as shown in FIG. 7 and FIG. 8, the cellular phone unit according to this embodiment detects the change of the contact position of the finger 32 and the change of the pressure distribution along with the movement of the finger 32 when the finger 32 moves while keeping contact with the panel surface 30. Then, on the basis of the detected change of the contact position and the detected change of the pressure distribution, the cellular phone unit controls the display position of the mouse pointer 33 and the direction indicated by the arrow of the mouse pointer 33.

FIG. 7 shows the case where the finger 32 moves to the right while keeping contact with the panel surface 30 after the finger 32 is placed slightly to the left side of the middle part of the panel surface 30. In FIG. 7, when the pressure distribution moves from the pressure distribution 40*e* to 40*f* as the finger of the user moves from the finger 32*a* to 32*b*, the display of the mouse pointer 33 is controlled so that it moves from the left side of the middle part of the panel surface 30 to the right side, that is, in the direction from the mouse pointer 33*a* to 33*b*, along with the movement of the pressure distribution 40.

FIG. 8 shows the case where the fingertip rotates clockwise while the contact position of the finger 32 does not move after the finger 32 is placed nearly on the middle part of the panel surface 30. In FIG. 8, when the pressure distribution rotates from the pressure distribution 40*g*, 40*h* to 40*i* as the finger of the user rotates from the finger 32*a*, 32*b* to 32*c*, the display of the mouse pointer 33 is controlled so that it rotates clockwise on the middle part of the panel surface 30 or the direction indicated by the arrow of the mouse pointer rotates clockwise on the basis of the rotation of the pressure distribution 40.

[The Case where a Finger Directly Points a Position on the Panel Surface]

The cellular phone unit according to this embodiment is configured to judge that the user is directly pointing at the contact position of the finger 32 if the contact pressure distribution caused by the finger 32 is not biased unlike the contact distribution shown in FIG. 2 or FIG. 3 while the finger 32 keeps contact with the panel surface 30.

Figure 9:
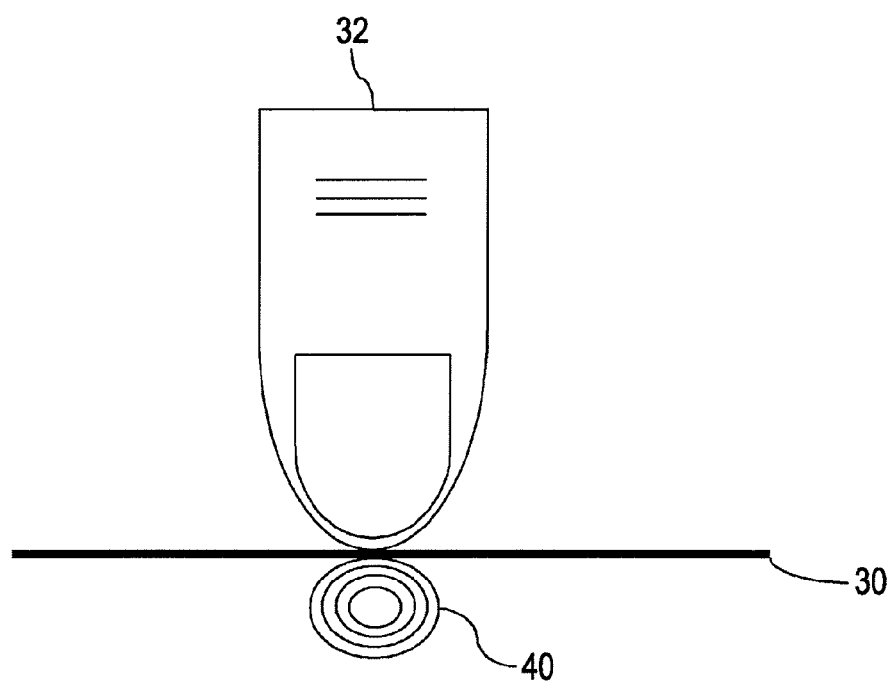
FIG. 9 is a diagram used to explain an example of contact pressure distribution when the finger is placed nearly at a right angle to the panel surface.

To put it concretely, if the contact pressure distribution is nearly balanced when the finger 32 is placed nearly at the right angle to the panel surface 30 as shown in FIG. 9, it is judged that the user is directly pointing at the contact position of the finger 32. In this case, the mouse pointer 33 may be displayed or not displayed, either is acceptable.

[Display Control in the Case where the Contact Position does Not Move and the Pressure Distribution Changes]

The cellular phone unit according to this embodiment is also configured to perform display control so that, when neither the contact position of the finger 32 nor the direction indicated by the fingertip changes on the panel surface 30 but only the contact pressure distribution changes, the position, the length/shape or the like of the mouse pointer 33 is changed on the basis of the pressure distribution.

Figure 10:
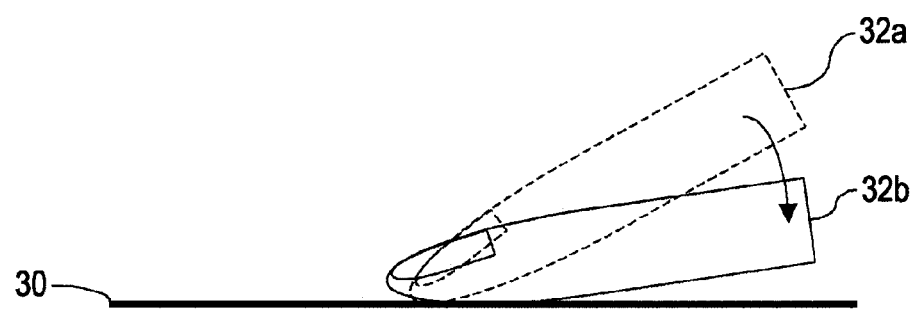
FIG. 10 is a diagram used to explain the case where only the pressure distribution changes while the contact position of the finger on the panel surface and the direction indicated by the fingertip do not change.
Figure 11:
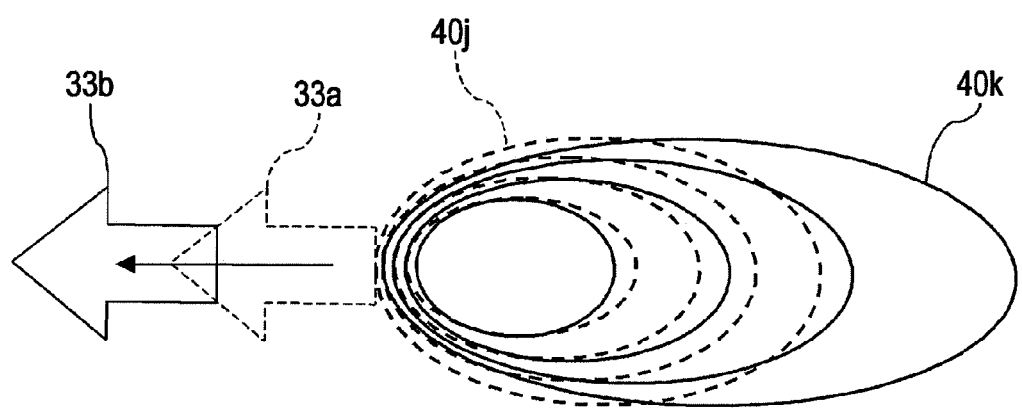
FIG. 11 is a diagram used to explain the case where only the pressure distribution changes while the contact position of the finger on the panel surface and the direction indicated by the fingertip do not change, and the display of the mouse pointer is controlled on the basis of the change of the pressure distribution.

FIG. 10 and FIG. 11 show the case where the pressure distribution is changed by changing the angle between the finger 32 and the panel surface 30 while the contact position of the finger 32 on the panel surface 30 and the direction indicated by the fingertip do not change.

To put it concretely, as shown in FIG. 10 and FIG. 11, the cellular phone unit according to this embodiment controls the display position, the length, the shape or the like of the mouse pointer 33 on the basis of the change of the pressure distribution when the pressure distribution changes from the pressure distribution 40$j$ to 40$k$ by changing the angle of the finger 32 from that of the finger 32$a$ to 32$b$ while the contact position of the finger 32 on the panel surface 30 and the direction indicated by the fingertip do not change.

FIG. 10 and FIG. 11 show an example of display control of the mouse pointer 33 in which the pressure distribution caused by the finger 32 changes from the pressure distribution 40$j$ to 40$k$ due to the angle between the finger 32 and the panel surface 30 changing from the large angle between the finger 32$a$ and the panel surface as shown by a dashed line in FIG. 10 to the small angle between the finger 32$b$ and the panel surface as shown by a solid line in FIG. 10.

In addition, FIG. 11 shows an example of display control in which the display position of the mouse pointer 33$a$ shown by a dashed line is changed to the display position of the mouse pointer 33$b$ shown by a solid line on the basis of the above-mentioned change of the pressure distribution.

Although FIG. 11 shows the example in which the display position of the mouse pointer 33 is changed, the length or shape of the mouse pointer 33 can be changed on the basis of the change of the pressure distribution.

In addition to one above, it may be also possible to perform display control in which the mouse pointer 33 is made thick and short when the angle between the finger 32$a$ and the panel surface 30 is large as shown in a dashed line in FIG. 10, and the mouse pointer 33 is made thin and long when the angle between the finger 32$b$ and the panel surface 30 is small as shown in a solid line in FIG. 10.

[Flow of Display Control Processing of the Mouse Pointer Based on Detected Pressure Values and the Pressure Distribution Obtained from the Touch Panel Unit]

Figure 12:
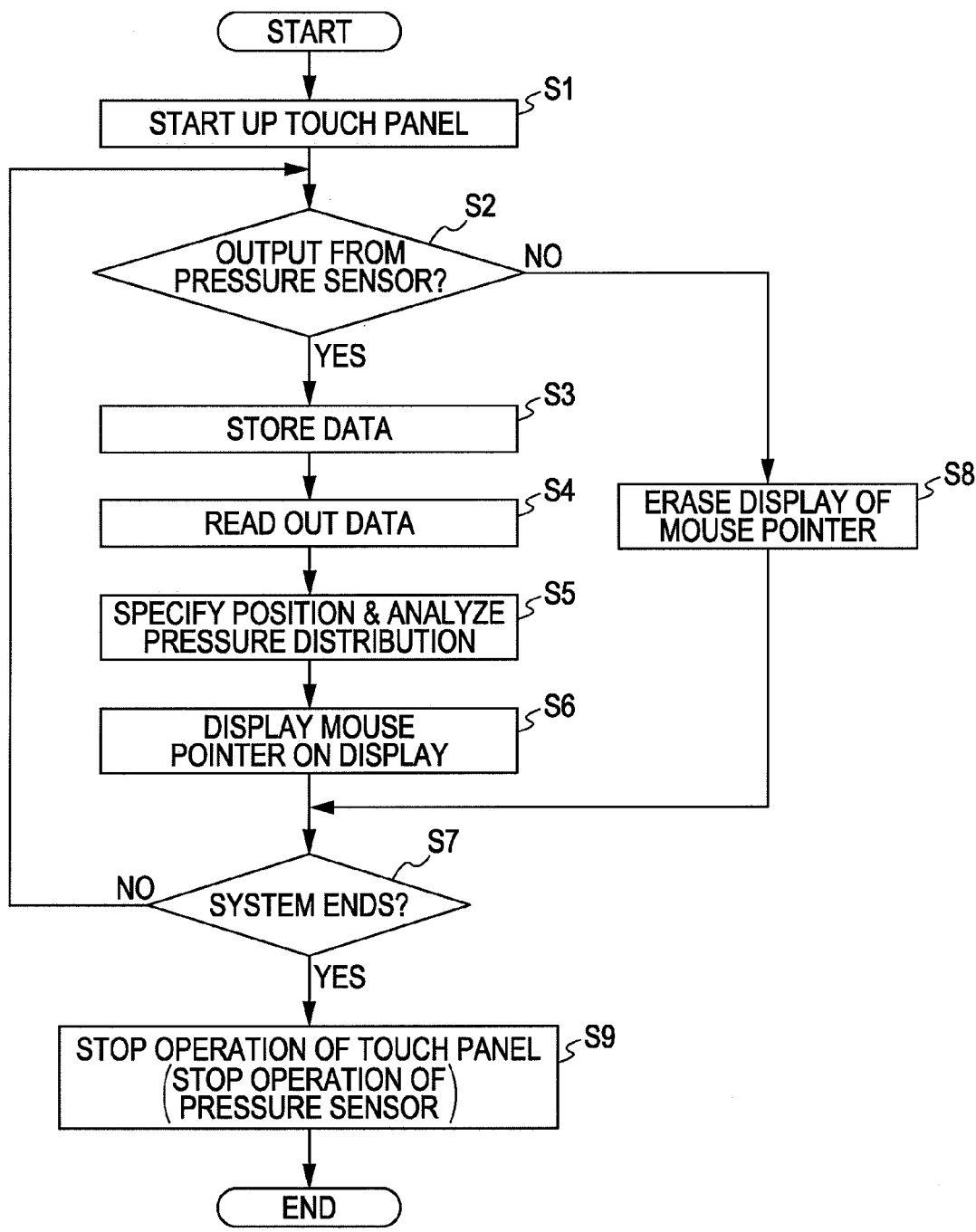
FIG. 12 is a flowchart showing the process flow of display control that the cellular phone unit according to this embodiment performs on the mouse pointer 33 on the basis of detected pressure values detected by the touch panel unit and the pressure distribution calculated from the detected pressure values.

The process flow of display control that the cellular phone unit according to this embodiment performs on the mouse pointer 33 on the basis of detected pressure values and the pressure distribution when a finger or the like makes contact with the touch panel 25 will be described below with the reference to a flowchart in FIG. 12. The processes shown in the flowchart in FIG. 12 are performed by the control unit 10 executing the display control program stored in the program storing module 17 of the memory unit 16. In addition, in the cellular phone unit according to this embodiment, the function of mouse pointer display control based on the above-mentioned detected pressure values and the pressure distribution can be set to either enabled or disabled, and when this function is set to enabled by a user, the processes in the flowchart in FIG. 12 are executed.

In FIG. 12, if the cellular phone unit is started up by its power supply being turned on when the function of the mouse pointer display control has been already enabled, or if the function of the mouse pointer display control is set from disabled to enabled when the cellular phone unit has been already started up, the control unit 10 makes the touch panel control unit 24 start up the touch panel 25 (or pressure sensors) at step S1.

Then the control unit 10 makes the touch panel control unit 24 scan the pressure detecting blocks 35 of the touch panel unit 25 sequentially to monitor whether any pressure detecting block 35 is depressed at step S2.

If detected pressure values are obtained from any pressure sensors in the monitoring process at step S2, the detected pressure values from the pressure sensors are converted to pressure value data, and the pressure value data along with the coordinate value data of the pressure sensors are temporary stored in the data storing unit 18 of the memory unit 16 under the control of the control unit 10 at step S3.

Next, the control unit 10 reads out the pressure value data and the coordinate value data stored in the data storing unit 18 at step S4.

At step S5, the control unit 10 analyzes the pressure value data and the coordinate value data read out from the data storing unit 18 in order to specify the depressed position and to calculate the pressure distribution as mentioned above.

Then at step S6, the control unit 10 makes the display control unit 15 display the mouse pointer on the display screen as mentioned above on the basis of the position and the pressure distribution calculated at step S5.

Next at step S7, the control unit 10 judges whether the power supply of the cellular phone unit is turned off or the function of mouse pointer display control is set to disabled. If either is not the case, the control unit 10 makes the process flow go back to step S2. On the other hand, if either is the case, the control unit 10 makes the process flow go to step S9.

At step S9, the control unit 10 makes the touch panel control unit 24 stop the operation of the touch panel unit 25 (or stop the operation of the pressure sensors), and ends this display control processing.

If any detected pressure values have not been obtained from any pressure sensors in the monitoring process at step S2 or if the user has not made contact with the touch panel unit 25, the control unit 10 makes the display control unit 15 erase the display of the mouse pointer on the display screen as the process at step S8, and makes the process flow go to step S7. Meanwhile, once the mouse pointer is displayed, the mouse pointer can be left as it is when the user takes his/her finger or the like off the touch panel unit 25.

[Application Examples of the Present Invention to Other Types of Touch Panels]

In the above-mentioned embodiment, although a touch panel of pressure sensitive type with pressure sensors is taken as an example touch panel for a cellular phone unit according to the present invention, the present invention can be applied to other types of touch panels. For example, for a resistive film type of touch panel, a resistivity distribution analogous to the above-mentioned pressure distribution can be analyzed by detecting the contact position of a finger and measuring in detail the resistivity values of the parts with which the finger makes contact. Then the display of a mouse pointer can be controlled on the basis of the resistivity distribution like in the case of the pressure sensitive type. As for an electrostatic capacitor detecting type of touch panel, an electrostatic capacitor value distribution analogous to the above-mentioned pressure distribution can be analyzed by detecting the contact position of a finger and the parts of the panel surface whose electrostatic values have changed because of the close proximity of the finger and measuring in detail the electrostatic values of the above parts. Then the display of a mouse pointer can be controlled on the basis of the electrostatic capacitor value distribution like in the case of the pressure sensitive type. For an electrostatic sensor type of touch panel, the display of a mouse pointer can be also controlled by performing detection analogous to the detection performed in the above electrostatic capacitor detecting type of touch panel. For an ultrasonic surface acoustic wave detecting type of touch panel, a distribution analogous to the above-mentioned pressure distribution can be analyzed by detecting the contact position of a finger and measuring differences among ultrasonic surface acoustic waves that change on the basis of the contact strengths shown by the parts with which the finger makes contact. Then the display of a mouse pointer can be controlled on the basis of the distribution like in the case of the pressure sensitive type. In addition, for an acoustic pulse recognition type of touch panel, the display of a mouse pointer can be also controlled by performing detection analogous to the detection performed in the ultrasonic surface acoustic wave detecting type of touch panel. For other types of touch panels, explanations for them are omitted; however, if the analysis of the contact position and the corresponding distribution for each type of touch panel can be performed, the present invention can be applied to it.

CONCLUSION

As described above, the cellular phone unit according to this embodiment of the present invention is configured to judge the position of a finger and the direction indicated by the finger by analyzing the position of the finger on the panel surface 30 of the touch panel 25 and the distribution of contacted parts of the position and display a mouse pointer 33 with its direction equal to the direction indicated by the finger. Therefore it becomes easy to operate the touch panel, and it is also ensured that desired icons and the like are touched.

The present application contains subject matter related to that disclosed in Japanese Priority Patent Application JP 2008-272780 filed in the Japan Patent Office on Oct. 23, 2008 the entire content of which is hereby incorporated by reference.

The above-described embodiment of the present invention is one embodiment according to the present invention. Therefore it goes without saying that the present invention is not limited to the above-described embodiment and various modifications of the present invention depending on design requirements and other factors may be made without departing from the technical ideas relating to the present invention. In addition, the present invention can be applied not only to a cellular phone unit but also to various types of terminals— such as a PDA (personal digital assistant) equipped with a touch panel, a personal computer, a portable TV game machine, a portable digital television receiver, a car navigation terminal and the like.

What is claimed is:

1. An information display apparatus comprising:
a contact detecting panel unit that detects at least contact and contours of a plurality of pressure distribution areas with the approximately transparent panel surface thereof made by an external object;
a display panel unit installed on the panel back surface of the contact detecting panel unit;
an analyzing unit that analyzes (a) a contact position on the panel surface with which the external object makes contact and (b) a direction indicated by the contours of the pressure distribution areas of a specific portion of the external object on the basis of output values from the contact detecting panel unit; and
a pointer control unit that controls a display position and a pointing direction of a predefined pointer image displayed on the display panel unit, without the external object hiding any part of the predefined pointer image, on the basis of the contact position and the direction indicated by the contours of the pressure distribution areas of the specific portion, wherein both the contact position and the direction are obtained from the analyzing unit.

2. The information display apparatus according to claim 1, wherein the pointer control unit controls the display position of the predefined pointer image in the direction indicated by the specific portion and in the vicinity of the contact position, and at the same time the pointer control unit controls a pointing direction of the predefined pointer image on the basis of the direction indicated by the specific portion.

3. The information display apparatus according to claim 1, wherein the analyzing unit calculates an output value distribution obtained from the contact portion of the panel surface with which the external object makes contact on the basis of the output values of the contact detecting panel unit and analyzes the direction indicated by the specific portion on the basis of the output value distribution.

4. The information display apparatus according to claim 1, wherein:
the analyzing unit analyzes a variation of the contact position on the basis of the output values of the contact detecting panel unit; and
the pointer control unit changes the display position of the predefined pointer image displayed on the display panel unit on the basis of the variation of the contact position obtained by the analyzing unit.

5. The information display apparatus according to claim 1, wherein:
the analyzing unit analyzes a variation of the direction indicated by the specific portion on the basis of the output values of the contact detecting panel unit; and
the pointer control unit changes the pointing direction of the predefined pointer image displayed on the display panel unit on the basis of the variation of the direction indicated by the specific portion that is obtained from the analyzing unit.

6. The information display apparatus according to claim 1, wherein:
the analyzing unit analyzes a variation of the contact position and a variation of the direction indicated by the specific portion on the basis of the output values of the contact detecting panel unit; and
the pointer control unit changes the display position of the predefined pointer image displayed on the display panel unit on the basis of the variation of the contact position obtained from the analyzing unit and changes the pointing direction of the predefined pointer image displayed on the display panel unit on the basis of the variation of the direction indicated by the specific portion.

7. The information display apparatus according to claim 1, wherein:
the contact detecting panel unit has a plurality of pressure sensors that detect a plurality of contact pressures on the panel surface applied by the external object; and
the analyzing unit analyzes the contact position and the direction indicated by the specific portion of the external object on the basis of the output values obtained from the plurality of pressure sensors of the contact detecting panel unit.

8. A mobile information unit comprising:
a contact detecting panel unit that detects at least contact and contours of a plurality of pressure distribution areas with the approximately transparent panel surface thereof made by an external object;
a display panel unit installed on the panel back surface thereof;
an analyzing unit that analyzes (a) a contact position on the panel surface of the contact detecting panel unit with which the external object makes contact and (b) a direction indicated by the contours of the pressure distribution areas of a specific portion of the external object on the basis of output values of the contact detecting panel unit; and a pointer control unit that controls the display position and pointing direction of a predefined pointer image displayed on the display panel unit, without the external object hiding any part of the predefined pointer image, on the basis of the contact position and the direction indicated by the contours of the pressure distribution areas of the specific portion, wherein both the contact position and the direction indicated by the specific portion are obtained from the analyzing unit.

9. A display control method comprising the steps of:

causing an analyzing unit to analyze (a) a contact position on an approximately transparent panel surface of a contact detecting panel unit with which an external object makes contact and (b) a direction indicated by contours of a plurality of pressure distribution areas of a specific portion of the external object on the basis of output values of the contact detecting panel unit, wherein the contact detecting panel unit detects at least contact and the contours of the pressure distribution areas with the panel surface made by the external object; and causing a pointer control unit to control a display position and a pointing direction of a predefined pointer image displayed on a display panel unit installed on the panel back surface of the contact detecting panel unit, without the external object hiding any part of the predefined pointer image, on the basis of the contact position and the direction indicated by the contours of the pressure distribution areas of the specific portion, wherein both the contact position and the direction indicated by the specific portion are obtained from the analyzing unit.

10. A display control program embodied on a non-transitory computer-readable medium that causes a computer to function as:

an analyzing unit that analyzes (a) a contact position on the approximately transparent panel surface of a contact detecting panel unit with which an external object makes contact and (b) a direction indicated by contours of a plurality of pressure distribution areas of a specific portion of the external object on the basis of output values of the contact detecting panel unit, wherein the contact detecting panel unit detects at least contact and the contours of the pressure distribution areas with the panel surface thereof made by the external object; and a pointer control unit that controls a display position and a pointing direction of a predefined pointer image displayed on the display panel unit installed on the panel back surface of the contact detecting panel unit, without the external object hiding any part of the predefined pointer image, on the basis of the contact position and the direction indicated by the specific portion, wherein both the contact position and the direction indicated by the contours of the pressure distribution areas of the specific portion are obtained from the analyzing unit.

* * * * *